3,388,161
AMINOMETHYL DERIVATIVES OF TETRACYCLINE

Giancarlo Lancini, Pavia, and Piero Sensi, Milan, Italy, assignors to Lepetit S.p.A., Milan, Italy
No Drawing. Filed Nov. 23, 1964, Ser. No. 413,343
Claims priority, application Great Britain, Dec. 6, 1963, 48,330/63
6 Claims. (Cl. 260—559)

This invention relates to new derivatives of the antibiotic tetracycline. Moreover, this invention relates to a new process for preparing a class of derivatives of the antibiotic tetracycline. It is known to prepare water soluble tetracycline derivatives through the Mannich reaction. This reaction consists in condensing a substance having active hydrogens with formaldehyde and a primary and secondary amine, with formation of those compounds which are known under the general definition of Mannich bases. In the case of tetracycline, Mannich bases were obtained starting from a lot of organic bases, either aliphatic, aromatic or heterocyclic, as described f.i. in German Patents 1,044,806, 1,063,598, and 1,088,481. However, all these derivatives, although fairly soluble in water, possess a low degree of stability, and a number of them are not well tolerated when administered by parenteral route.

In order to improve stability and tolerance, other derivatives were prepared containing a carboxy group, by using as starting material some amino acids. However, while compounds of better stability were obtained, the antibiotic activity was more or less decreased. This was due to the fact that by working under the conditions described in literature, tetracycline readily undergoes conversion into the inactive isomer epitetracycline.

One purpose of this invention is to afford a simple method for obtaining tetracycline derivatives with formaldehyde and a aliphatic or aromatic amino acid, whereby highly active condensation products are obtained in a very high yield.

Another purpose of this invention is to provide a class of new Mannich bases of tetracycline with improved properties of stability, water solubility and tolerance by parenteral route.

A further object of the invention is to provide tetracycline derivatives with a epitetracycline content far lower than in Mannich bases of tetracycline obtained by the known methods.

According to the process herein described and claimed, one mole of tetracycline, one or two moles of formaldehyde and about one mole of the selected amino-acid are reacted together in the presence of a sufficient amount of a tertiary organic base, such as triethylamine, trimethylamine or pyridine, to have a slightly alkaline reaction of the mixture, at a pH value between about 7.5 and 8.5. Although the reaction runs quite well in all solvents commonly used in the Mannich reaction, the best results are obtained by working in a lower aliphatic alcohol, such as methanol or ethanol. Under these conditions the reaction is complete in 5–15 minutes at a temperature between 10 and 50° C., and practically no epitetracycline is formed. After addition of a mineral acid to pH about 4–5 the product precipitates and is collected. Yields are usually very high.

The following is a table comparing yields and epitetracycline formation obtained (A) by the process of the present invention, (B) by the process described in Farmaco, Ed. Prat., 16, 65 (1961) and (C) by the process described in U.S. Patent 3,042,716 for the prepration of the γ-amino-acid derivatives, using some representative starting compounds.

TABLE 1

| Starting compound | Process | Percent Yield | Percent tetracycline plus epitetracycline | Percent epitetracycline |
|---|---|---|---|---|
| 4-piperidinecarboxylic acid | A | 68.7 | 72.7 | 1.2 |
|  | B | 40.5 | 74.4 | 14.3 |
|  | C | 26.4 | 52.5 | 5.8 |
| 3-piperidineacetic acid | A | 65 | 73.9 | <1 |
|  | B | 40 | 67 | 13.7 |
|  | C | 28 | 46 | 6.5 |
| 3-piperidinecarboxylic acid | A | 71 | 76.9 | 1.4 |
|  | B | 35.1 | 71 | 10 |
|  | C | 25 | 52 | 4.5 |
| γ-aminobutyric acid | A | 62.5 | 77.3 | <1 |
|  | B | 37 | 77 | 17.5 |
|  | C | 24 | 41.3 | 10 |

While the process was found to run very satisfactorily with a large number of amino acids, which have already been used for this purpose though with poor results as far as yield and activity were concerned, a very interesting new class of derivatives was obtained by using as starting material a compound of the formula

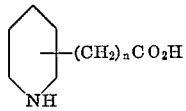

wherein $n$ is an integer from 0 to 3. In particular, the most interesting derivatives are those obtained by starting from 3-piperidinecarboxylic, 4-piperidinecarboxylic and 3-piperidineacetic acids, of which the antibacterial spectrum against some representative bacteria is reported in the following table, in comparison with tetracycline.

TABLE 2.—ANTIBACTERIAL ACTIVITY IN VITRO MINIMAL INHIBITORY CONCENTRATION IN γ/ML.

|  | Tetracycline derivative with— | | | Tetracycline |
|---|---|---|---|---|
|  | 3-piperidinecarboxylic acid | 4-piperidinecarboxylic acid | 3-piperidineacetic acid | |
| M. aureus | 0.1 | 0.1 | 0.05 | 0.1 |
| S. hemolyticus | 0.1 | 0.1 | 0.1 | 0.1 |
| S. faecalis | 0.1 | 0.2 | 0.1 | 0.1 |
| B. subtilis | 0.05 | 0.05 | 0.05 | 0.05 |
| Proteus X 19 | 5 | 5 | 5 | 5 |
| E. coli | 0.2 | 0.2 | 0.2 | 0.2 |
| Klebsiella pneumoniae | 0.2 | 0.2 | 0.2 | 0.2 |
| Pseudomonas aeruginosa | 10 | 10 | 10 | 10 |

The new Mannich bases of tetracycline with said piperidine acids show a degree of stability which is far higher than in the case of the Mannich bases with organic bases such as pyrrolidine, morpholine, N-hydroxyethylpiperazine and basic amino acids such as lysine. They are highly soluble in water at a pH between 3 and 8. The water solutions do not give any precipitate on standing and no hydrolysis of the dissolved compound is observed.

The topical tolerance after intramuscular administration is better than for all other tetracycline Mannich bases. The following is the result of a comparison in this respect between (3-carboxymethyl-1-piperidino)-methyltetracycline and other commercially used Mannich bases of tetracycline. The substances were injected intramuscularly in mice (groups of 5 animals) in a concentration corresponding to 100 mg. tetracycline per ml. of solution.

(3 - carboxymethyl - 1 - piperidino)-methyltetracycline (dissolved in aqueous 2 percent $NaHCO_3$, pH 7.75). The product was well absorbed. Some little bleeding in the muscular mass. The muscle is slightly increased in volume.

[4 - (β - hydroxyethyl) - 1 - piperidino] - methyltetracycline.—(Water solution, pH 5.9). Slight yellow color due to some residual product. In some animals, small crops of slurried product. The muscle is increased in volume. Subcutaneous edema, occasionally present.

Pyrrolidinomethyltetracycline (water solution, pH 5.6). Traces of residual yellow product, little bleeding in the muscular mass. The muscle is increased in volume. Subcutaneous edema, occasionally with very abundant edematous liquor.

Lysinomethyltetracycline (water solution, pH 4.5). Traces of residual slurried product, in some instances very abundant. Edema, much marked in two cases. Small bleedings in the muscular mass.

Our product was therefore the sole compound under investigation which was totally absorbed after intramuscular administration.

Another unique property of the compounds of this invention is the possibility of adminstration by rectal route. It is well known that tetracycline antibiotics are not absorbed when given in the form of suppositories. On the contrary, the carboxypiperidinomethyltetracyclines give very satisfactory blood levels of the antibiotic.

The following is a table giving the blood levels in man at various interval after administration of one suppository containing 500 mg. of (3-carboxy-λ-piperidino)-methyltetracycline. The values are expressed in γ/ml. and are the average of the values observed in 10 human patients:

Blood levels after 1 hour, 0.81; 2 hours, 0.78; 3 hours, 0.51. These figures correspond to therapeutically useful doses of tetracycline.

The following non limitative examples are given for the purpose of better illustrating the invention.

Example 1.—(4-carboxy-1-piperidino)-methyltetracycline

A mixture of 2.2 g. of tetracycline, 0.7 ml. of triethylamine and 40 ml. ethanol is warmed to 40° C., then 0.65 g. 4-piperidinecarboxylic acid in 1.5 ml. water is added, followed by 0.5 ml. of 40% aqueous formaldehyde. After 5 minutes at 40° C. the solution is cooled to 25° C. and 0.5 ml. of 10 N hydrochloric acid are added. The bright yellow crystalline precipitate is collected and dried. Yield 2.25 g., with a spectrophotometric assay of 72.7% (calculated as tetracycline hydrochloride). The percentage of epitetracycline, as determined by chromatography, is 1.2%.

Example 2.—(3-carboxymethyl-1-piperidino)-methyltetracycline

A mixture of 11.0 g. of tetracycline, 3.5 ml. of triethylamine and 250 ml. of ethanol is warmed to 40° C., then a solution of 3.6 g. of 3-piperidineacetic acid in 7.5 ml. of water is added, followed by 2.5 ml. of 40% aqueous formaldehyde. After 5 minutes at 40° C. the solution is cooled to 25° C. and 2.5 ml. of 10 N hydrochloric acid are added. The yellow crystalline precipitate is collected and dried. Yield 10.5 g., with a spectrophotometric assay of 73.9% (calculated as tetracycline hydrochloride). The percentage of epitetracycline, as determined chromatographically, is less than 1%.

Example 3.—(3-carboxy-1-piperidino)-methyltetracycline

A mixture of 22.0 g. tetracycline, 7.0 ml. triethylamine and 500 ml. of ethanol is warmed for 40°, then a solution of 6.5 g. of 3-piperidinecarboxylic acid in 15 ml. of water is added, followed by 5 ml. of 40% aqueous formaldehyde. After 5 minutes at 40° C. the solution is cooled to 25° C. and 5 ml. of 10 N hydrochloric acid are added. The yellow crystalline precipitate is collected and dried. Yield 22 g., with a spectrophotometric assay of 76.9% (calculated as tetracycline hydrochloride). The percentage of epitetracycline, as determined chromatographically, is 1.4%.

Example 4.—γ-carboxypropylaminomethyltetracycline

A mixture of 22 g. tetracycline, 7 ml. triethylamine and 400 ml. of ethanol is warmed to 40° C., then 5.1 g. of γ-aminobutyric acid dissolved in 8 ml. of water, followed by 5 ml. of 40% aqueous formaldehyde are added. After 5 minutes at 40° C. the solution is cooled to 25° C. and 5 ml. of 10 N hydrochloric acid are added. The bright yellow crystalline precipitate is collected and dried. Yield 20.5 g., spectrophotometric assay 77.3% (as tetracycline hydrochloride). The epitetracycline content is less than 1%.

We claim:

1. A process for preparing aminomethyl derivatives of tetracycline, which consists in contacting one mole of tetracycline, 1 to 2 moles of formaldehyde and about one mole of an aminoacid selected from aliphatic and aromatic aminoacids and a compound of the formula

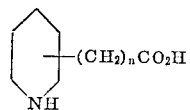

wherein $n$ represents an integer from 0 to 3 inclusive, in the presence of an amount of a tertiary organic base sufficient to impart to the mixture a pH value between about 7.5 and 8.5 at a temperature of 10–50° C. for 5–15 minutes.

2. A process for preparing aminomethyl derivatives of tetracycline, which consists in contacting one mole of tetracycline, 1 to 2 moles of formaldehyde and about one mole of a compound of the formula

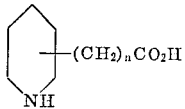

wherein $n$ represents an integer from 0 to 3 inclusive, in the presence of an amount of a tertiary organic base sufficient to impart to the mixture a pH value between about 7.5 and 8.5 at a temperature of 10–50° C. for 5–15 minutes.

3. Compounds of the formula
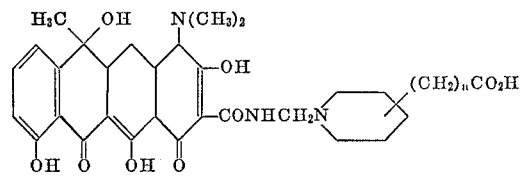
wherein *n* represents an integer from 0 to 3 inclusive.
4. (3-carboxymethyl-1-piperidino)-methyltetracycline.
5. (3-carboxy-1-piperidino)-methyltetracycline.
6. (4-carboxy-1-piperidino)-methyltetracycline.
References Cited
UNITED STATES PATENTS
3,272,817   9/1966   Gordon et al. _____ 260—559
NICHOLAS S. RIZZO, *Primary Examiner.*